US009444743B2

(12) United States Patent
Oikawa et al.

(10) Patent No.: US 9,444,743 B2
(45) Date of Patent: Sep. 13, 2016

(54) NETWORK SYSTEM, SWITCH AND CONNECTED TERMINAL DETECTION METHOD

(75) Inventors: Seiji Oikawa, Tokyo (JP); Masanori Takashima, Tokyo (JP)

(73) Assignee: NEC Corporation, Tokyo (JP)

( * ) Notice: Subject to any disclaimer, the term of this patent is extended or adjusted under 35 U.S.C. 154(b) by 63 days.

(21) Appl. No.: 14/009,677

(22) PCT Filed: Mar. 28, 2012

(86) PCT No.: PCT/JP2012/058150
§ 371 (c)(1),
(2), (4) Date: Oct. 3, 2013

(87) PCT Pub. No.: WO2012/137646
PCT Pub. Date: Oct. 11, 2012

(65) Prior Publication Data

US 2014/0022894 A1 Jan. 23, 2014

(30) Foreign Application Priority Data

Apr. 4, 2011 (JP) ................................ 2011-082765

(51) Int. Cl.
*H04L 12/801* (2013.01)
*H04L 12/803* (2013.01)
(Continued)

(52) U.S. Cl.
CPC ........... *H04L 47/125* (2013.01); *H04L 12/462* (2013.01); *H04L 49/70* (2013.01)

(58) Field of Classification Search
CPC ..... H04L 45/02; H04L 45/54; H04L 45/745; H04L 49/254; H04L 45/00; H04L 45/74; H04L 47/10; H04L 47/2483; H04L 47/80
See application file for complete search history.

(56) References Cited

U.S. PATENT DOCUMENTS

2009/0097485 A1 4/2009 Okada et al.
2009/0138577 A1* 5/2009 Casado et al. ................ 709/220
(Continued)

FOREIGN PATENT DOCUMENTS

CN 101409672 A 4/2009
EP 1 976 195 A1 10/2008
(Continued)

OTHER PUBLICATIONS

"OpenFlow Switch Specification, Version 1.0.0", [online], Dec. 31, 2009, search on Mar. 23, 2011, <URL:http://www.openflowswitch.org/documents/openflow-spec-v1.0.0.pdf>.
International Search Report of the Japanese Patent Office (translation) and Written Opinion of ISA.
(Continued)

*Primary Examiner* — Scott M Sciacca
(74) *Attorney, Agent, or Firm* — Finnegan, Henderson, Farabow, Garrett & Dunner LLP

(57) ABSTRACT

In an OpenFlow network, it is determined which port of which node device a terminal connected to a group of node devices is connected to, by only using the source MAC address and port number of a packet transmitted from the terminal. Specifically, the node device compares a set of the port number and source MAC address information of a packet transmitted from the terminal to the node device with a set(s) of a port number and MAC address information held in a preliminary search table to check whether they match each other. When the comparison does not result in a match, the node device notifies the controller by using the inquiry information (packet-in) function of OpenFlow. Furthermore, the node device compares the destination MAC address information of the packet with a set(s) of MAC address information held in a final search table to check whether they match each other.

17 Claims, 11 Drawing Sheets

(51) Int. Cl.
*H04L 12/46* (2006.01)
*H04L 12/931* (2013.01)

(56) References Cited

U.S. PATENT DOCUMENTS

| | | | | |
|---|---|---|---|---|
| 2011/0134924 | A1* | 6/2011 | Hewson et al. | 370/392 |
| 2011/0261825 | A1 | 10/2011 | Ichino | |
| 2011/0286324 | A1* | 11/2011 | Bellagamba et al. | 370/219 |
| 2011/0317559 | A1* | 12/2011 | Kern et al. | 370/235 |
| 2012/0044813 | A1* | 2/2012 | Nandagopal et al. | 370/242 |
| 2012/0099591 | A1* | 4/2012 | Kotha et al. | 370/392 |
| 2012/0155467 | A1* | 6/2012 | Appenzeller | 370/392 |

FOREIGN PATENT DOCUMENTS

| | | | |
|---|---|---|---|
| EP | 2 487 843 | A1 | 8/2012 |
| JP | 2003-324468 | | 11/2003 |
| JP | 2004-153775 | | 5/2004 |
| JP | 2007-318432 | | 12/2007 |
| JP | 2009-239625 | | 10/2009 |
| WO | WO 2010/103909 | A1 | 9/2010 |

OTHER PUBLICATIONS

"OpenFlow Switch Specification, Version 1.0.0 Implemented" pp. 1-56, Feb. 2011.

N. McKeown et al., "OpenFlow: Enabling Innovation in Campus Networks", ACM SIGCOMM Computer Communication Review, vol. 38, No. 2, pp. 69-74, Apr. 2008.

Extended European Search Report dated Aug. 4, 2014 issued by the European Patent Office in European Patent Application No. 12767795.3.

Office Action issued by the Japanese Patent Office in counterpart Japanese Patent Application No. 2013-508826.

Office Action (mailing date Jun. 23, 2014) issued by the Japanese Patent Office in counterpart Japanese Patent Application No. 2013-508826.

English translation of the International Preliminary Report on Patentability issued Oct. 8, 2013 and Written Opinion of the International Searching Authority mailed May 22, 2012 in corresponding PCT Application No. PCT/JP2012/058150.

Office Action issued by the Chinese Patent Office in counterpart Chinese Patent Application No. 201280017014.3, dated Oct. 10, 2015.

* cited by examiner

| TERMINAL LOCATION INFORMATION MANAGEMENT TABLE | | |
|---|---|---|
| NODE DEVICE INFORMATION | TERMINAL MAC INFORMATION | PORT NUMBER |
| 1 | 00:aa:aa:aa:aa:aa | 1 |
| 1 | 00:aa:aa:aa:aa:bb | 2 |
| 2 | 00:11:aa:aa:aa:bb | 1 |
| . . . . | . . . . | . . . . |

311 312 313

NETWORK SYSTEM, SWITCH AND CONNECTED TERMINAL DETECTION METHOD

CROSS-REFERENCE TO RELATED PATENT APPLICATIONS

This application is a National Stage Entry of International Application No. PCT/JP2012/058150, filed Mar. 28, 2012, which claims priority from Japanese Patent Application No. 2011-082765, filed Apr. 4, 2011. The entire contents of the above-referenced applications are expressly incorporated herein by reference.

TECHNICAL FIELD

The present invention relates to a network system, more particularly, to a network system which detects a terminal connected to a switch.

BACKGROUND ART

Conventional network devices suffer from a problem that they cannot be externally controlled to achieve flexible control, such as load balancing and biasing. Accordingly, an increase in the network size makes it difficult to monitor and improve the behavior of the system, requiring a huge cost for changing the design and configuration.

As a technique for solving such a problem, an approach has been proposed in which the packet transfer function and the route control function of network devices are separated. If network devices are responsible for the packet transfer function and a controller externally provided separately from the network devices are responsible for the control function, for example, this allows the controller to perform centralized management of packet transfers, enabling establishment of a flexible network.

Explanation of CD-Separated Network

As one of function-separated networks, a CD (C: control plane/D: data plane)-separated network, in which a controller provided on the control plane side controls node devices provided on the data plane side, has been proposed.

One example of the CD-separated network is the OpenFlow network, which uses an OpenFlow technology achieving the route control of the network by controlling switches from a controller. Details of the OpenFlow technology is described in non-patent literature 1. It should be noted that the OpenFlow network is merely one example.

Explanation of OpenFlow Network

In an OpenFlow network, a controller such as an OpenFlow controller (OFC) controls the behavior of node devices by operating flow tables of node devices such as OpenFlow switches (OFSs), where the flow tables are related to the route control.

The controller and the node devices are connected via control channels (communication channels for control) which are dedicated lines or communication lines protected by SSL (secure Socket Layer), called "secure channels". The controller and the node devices exchanges OpenFlow messages which are control messages complying (or supporting) the OpenFlow protocol, via the control channels.

Node devices in an OpenFlow network mean edge switches and core switches which are provided in the OpenFlow network and subjected to control of the controller. A series of travels of packets from reception on an ingress edge switch to output on an egress edge switch in the OpenFlow network is called "flow." In the OpenFlow network, communications are each recognized as an end-to-end (E2E) flow, and the route control failure recovery, load balancing and optimization are achieved in units of flows.

A frame may be used in place of a packet. The difference between the packet and the frame exists only in the difference of the data unit handled by the protocol (that is, the protocol data unit (PDU)). The packet is the PDU of "TCP/IP" (transmission control protocol/internet protocol). The frame is, on the other hand, the PDU of the "Ethernet" (registered trademark).

The flow table is a group of flow entries which each define a set of an identification condition (or a rule) identifying packets to be handled as a flow, statistic information indicative of the number of matches of packets to the rule and contents of processing (or an action) to be performed on packets.

The rules of the flow entries are defined by various combinations using any or all of information of respective protocol layers included in header regions (or fields) of packets and distinguishable from one another. Possible examples of information of respective protocol layers may include a destination address, a source address, a destination port and a source port. It should be understood that the above-described addresses mean to include a MAC address (media access control address) and an IP address (internet protocol address). In addition to the listed above, information of an ingress port may be also used as the rule of a flow entry. It should be also noted that a representation which represents some (or all) of the values of the header regions of packets to be handled as a flow by using a regular expression, a wild card "*", or the like may be set as the rule of a flow entry.

The action of a flow entry indicates an operation, such as "output to a specific port", "discard", and "rewriting of the header". When identification information (such as the output port number) is indicated in the action of a flow entry, for example, the node device outputs the packet to the relevant port; when no identification information of the output port is indicated, the node device discards the packet. In another example, when header information is indicated in the action of a flow entry, the node device rewrites the header of the packet on the basis of the header information.

A node device performs the action of a flow entry on a group of packets (a series of packets) which match the rule of the flow entry. Specifically, when receiving a packet, a node device searches the flow table for a flow entry having a rule which matches the header information of the received packet. When successfully finding a flow entry having the rule which matches the header information of the received packet, the node device updates the statistic information of the flow entry and performs an operation specified as the action of the flow entry on the received packet. When no flow entry having the rule which matches the header information of the received packet is not found, the node device determines the received packet as the first packet, forwards the received packet (or a copy thereof) to the controller in the OpenFlow network, requests packet route calculation based on the source and destination of the received packet, receives a message for setting a flow entry as a response, and updates the flow table.

It should be noted that a default entry having a rule which matches header information of all packets is registered with a low priority in the flow table. When no other flow entry which matches the received packet is found, the received packet matches the default entry. The action of the default entry is defined as "transmission of inquiry information of the received packet to the controller."

CITATION LIST

Non-Patent Literature

[Non-Patent Literature 1]

"OpenFlow Switch Specification, Version 1.0.0", [online], Dec. 31, 2009, searched on Mar. 23, 2011, <URL: http://www.openflowswitch.org/documents/openflow-spec-v1.0.0.pdf>

SUMMARY OF INVENTION

For a large-sized network, there is a possibility of a shortage of resources due to the poor efficiency of the current usage of the flow table.

Additionally, in the existing technology, switches cannot obtain terminal location information (information indicative of the current location of a terminal on the network) when no broadcast packet has been transmitted, because the switches obtains terminal location information by using a broadcast packet, such as ARP.

In the present invention, when a packet is transmitted from a terminal to a node device, the node device compares two items: MAC address information held by the node device and a port number associated with the MAC address information with the source MAC address information and the port number of the packet to be forwarded.

When no matching information is found as the result of the comparison, the node device transmits inquiry information (packet-in) to a controller, and location information of the terminal is managed in the controller; this information is registered in the node device from the controller. The inquiry information (packet-in) is one of OpenFlow messages.

As a technique in the comparison, it maybe preferable to perform the comparison by using a logic similar to an L2 learning function.

A network system according to the present invention includes: a switch; and a controller setting a flow entry to a flow table of the switch, the flow entry defining a rule and action for collectively controlling packets as a flow. When receiving a packet from a terminal, the switch notifies the controller of a set of the source MAC address information and port number of the packet. The controller recognizes the current location of the terminal on the network on the basis of the notification of the switch, the terminal being the source of the packet.

A switch according to the present invention includes: means for, when receiving a packet from a terminal, notifying a controller of a set of the source MAC address information and port number of the packet as the current location information of the terminal on the network, the terminal being the source of the packet; and means for setting a flow entry to a flow table thereof in response to a control from the controller, the flow entry defining a rule and action for collectively controlling the packet as a flow.

In a connecting terminal detection method according to the present invention, a controller sets a flow entry to a flow table of a switch, the flow entry defining a rule and action for collectively controlling packets as a flow. When receiving a packet from a terminal, the switch notifies the controller of a set of the source MAC address information and port number of the packet. The controller recognizes the current location of the terminal on the network on the basis of the notification from the switch, the terminal being the source of the packet.

A program according to the present invention is a program for causing a switch to perform steps of: when receiving a packet, notifying a controller of a set of the source MAC address information and port number of the packet as current location information of the terminal on the network, the terminal being the source of the packet; and setting a flow entry to a flow table thereof in response to a control from the controller, the flow entry defining a rule and action for collectively controlling the packet as a flow. It should be noted that the program according to the present invention may be stored in a storage device or a recording medium.

The present invention determines which port of which node device a terminal connected to a group of node devices is connected to, using only the source MAC address and port number (port information) of a packet transmitted from the terminal. In addition, a route control taking account of the terminal location is achieved by managing this terminal connection information by the controller.

BRIEF DESCRIPTION OF DRAWINGS

FIG. 4 is a diagram for explaining a terminal location information management table;

DESCRIPTION OF EXEMPLARY EMBODIMENTS

The present invention is directed to a CD-separated network. Here, a description is given of an OpenFlow network, which is one of CD-separated networks, as an example. It should be noted that an actual implementation is not limited to an OpenFlow network.

<First Exemplary Embodiment>

In the following, a description is given of a first exemplary embodiment of the present invention with reference to the attached drawings.

[System Configuration]

Figure 1:
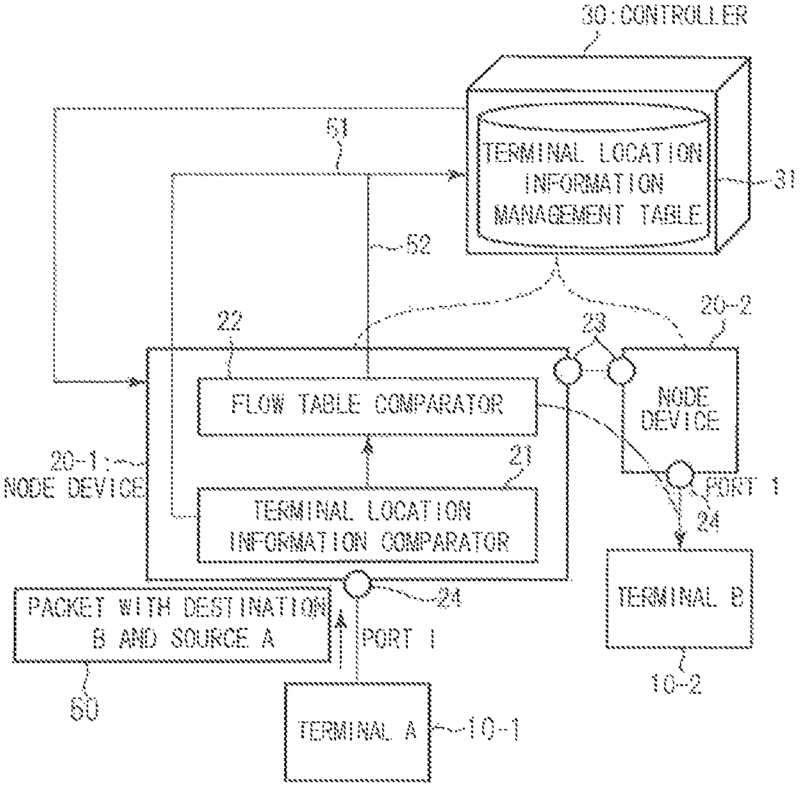
FIG. 1 is a diagram illustrating a configuration example of a network system according to a first exemplary embodiment of the present invention.

With reference to FIG. 1, a description is given of a configuration example of a network system according to the first exemplary embodiment.

The network system according to the first exemplary embodiment of the present invention includes terminals 10 (10-i where i=1 to n, n being arbitrary), node devices 20 (20-j where j=1 to m, m being arbitrary) and a controller 30.

[Details of Terminals]

Each terminal 10 (10-i, where i=1 to n) is a terminal connectable to a node device 20 (20-j, where j=1 to m).

In this exemplary embodiment, a packet 50 is transferred from the terminal 10-1 to the terminal 10-2 via the node devices 20-1 and 20-2.

The terminal 10-1 is source terminal "A" which transmits the packet. The terminal 10-2, on the other hand, is destination terminal "B" which receives the packet. The packet 50 is a "packet with destination B and source A."

The "destination B" means that the destination is terminal B and the MAC address of terminal B is specified as the destination MAC address. The "source A" means that the source is terminal A and the MAC address of terminal A is specified as the source MAC address.

It should be noted that each terminal 10 (10-i, where i=1 to n) may be a network device outside the OpenFlow network (not supporting OpenFlow).

[Details of Node Devices]

Each node device 20 (20-j, where j=1 to m) is a node device arranged on the network. Each node device 20 (20-j, where j=1 to m) operates as an OpenFlow switch (OFS) in the OpenFlow network. Each node device 20 (20-j, where j=1 to m) transfers packets received thereby in accordance with flow entries registered in its own flow table.

Each node device 20 (20-j, where j=1 to m) includes a terminal location information comparator 21 and a flow table comparator 22.

The terminal location information comparator 21 performs terminal location information comparison by using MAC address information and port numbers. Specifically, the terminal location information comparator 21 holds MAC address information and a port number, and compares the set of the MAC address information and port number held therein with a set of the source MAC address information and port number of a packet to be transferred. In this exemplary embodiment, the terminal location information comparator 21 is an L2 (layer 2) function block, that is, an L2 block.

The flow table comparator 22 performs comparison of the flow table and flow information, which is performed by a usual node device.

[Details of Controller]

The controller 30 controls and manages the node devices arranged over the network. The controller 30 operates as an OpenFlow controller (OFC) in the OpenFlow network. When detecting the node devices 20-1 and 20-2, the controller 30 calculates a packet transfer route on the basis of topology information indicative of the connections in the network, and registers flow entries into the flow tables of the node devices related to the route. The controller 30 thereby performs route control between the node devices 20-1 and 20-2.

The controller 30 has a terminal location information management table 31.

[Details of Packet]

The packet 50 is a packet to be transmitted to a node device 20 (20-j, where j=1 to m).

Inquiry information (packet-in) 51 is a control message for requesting the controller 30 for a route control (or making an inquiry about the transfer route of the packet 50). The data format and contents of the inquiry information (packet-in) 51 are same as those of inquiry information (packet-in) transmitted to the controller when a mismatch occurs in a usual flow table search; information for identification (or a flag) is attached with the inquiry information (packet-in) 51.

When receiving the packet 50, for example, the terminal location information comparator 21 compares the MAC address information held in the terminal location information comparator 21 and the port number associated with the MAC address information, with the set of the source MAC address information and port number of the packet 50 to be transferred and, when a mismatch occurs, generates the inquiry information (packet-in) 51 based on the packet 50 to transmit the inquiry information (packet-in) 51 to the controller 30.

Inquiry information (packet-in) 52 is a control message for requesting the controller 30 for a route control (or making an inquiry about the transfer route of the packet 50). The difference between the inquiry information (packet-in) 52 and usual inquiry information (packet-in) exists only in information for identification (or the flag); the data format and contents of the inquiry information (packet-in) 52 are basically same as those of usual inquiry information (packet-in).

For example, the flow table comparator 22 compares MAC address information stored in the flow entries of the flow table with the destination MAC address information of the packet 50 to be transferred, and, when a mismatch occurs, generates the inquiry information (packet-in) 52 based on the packet 50 to transmit the inquiry information (packet-in) 52 to the controller 30.

In this exemplary embodiment, the controller 30 defines connection ports by which node devices are connected as inside ports 23. Also, the controller 30 defines a connection port of a node device, by which the node device and a terminal is connected, as an outside port 24.

The controller 30 recognizes a terminal 10-1 which is newly connected to the node device 20-1, on the basis of the contents of the inquiry information (packet-in) 51 received from the node device 20-1. Specifically, the controller 30 obtains the MAC address information of the terminal 10-1 and the port number of the port connected to the terminal 10-1 from the contents of the inquiry information (packet-in) 51, and updates the terminal location information management table 31. It should be noted that the port connected to the terminal 10-1 is an outside port 24, inevitably.

The controller 30 rewrites the table of each node device 20 (20-j, where j=1 to m) for received packets, on the basis of the contents of the terminal location information management table 31.

[Internal Configuration of Node Devices]

Figure 2:
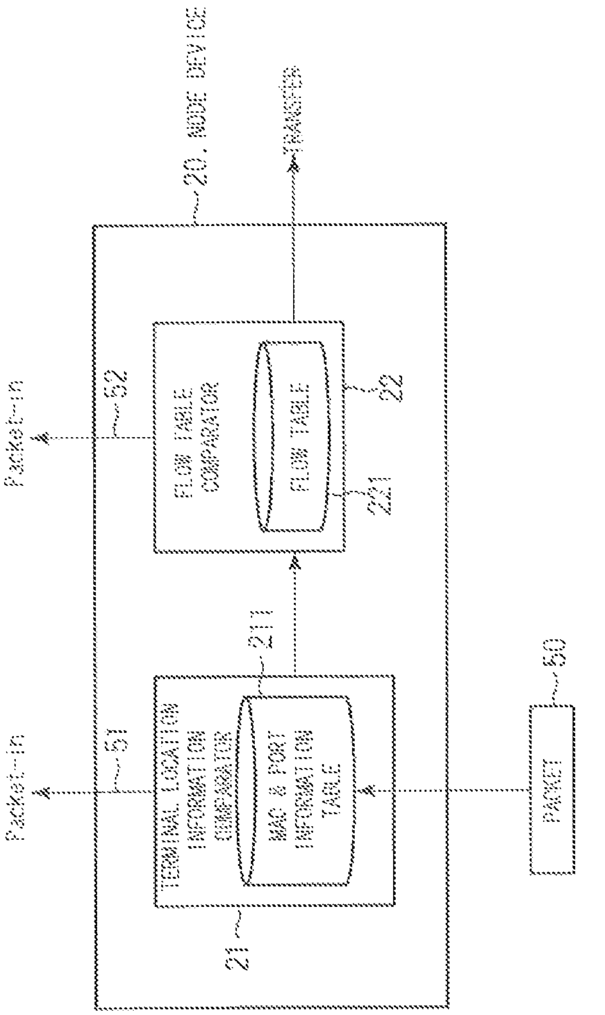
FIG. 2 is a diagram for explaining the internal configuration of a node device according to the first exemplary embodiment.

With reference to FIG. 2, a description is given of the internal configuration of each node device 20 (20-j, where j=1 to m) in the present exemplary embodiment.

Each node device 20 (20-j, where j=1 to m) includes the terminal location information comparator 21 and the flow table comparator 22.

The terminal location information comparator 21 has a MAC & port information (terminal location information) table 211.

The MAC & port information table 211 stores therein the MAC address information held by the node device 20 (20-j, where j=1 to m) and the port number associated with this MAC address information. In this exemplary embodiment, the MAC & port information table 211 is used as a preliminary search table which is searched before a flow table 221. It should be noted that the MAC & port information table 211 may be considered as a sort of flow table which defines identification conditions (or rules) by sets of MAC address information and port numbers.

The flow table comparator 22 has a flow table 221.

The flow table 221 is a flow table in the OpenFlow network. In this exemplary embodiment, the flow table 221 is a final search table, which is searched after the MAC & port information table 211.

In this exemplary embodiment, the flow table 221 is only required to be registered with flow entries which define identification conditions (or rules) by only destination MAC addresses, since the terminal location information comparator 21 performs a search for terminal location information.

This allows largely reducing information of the flow entries registered in each flow table 221.

[Comparison Contents of Terminal Location Information]

Figure 3:
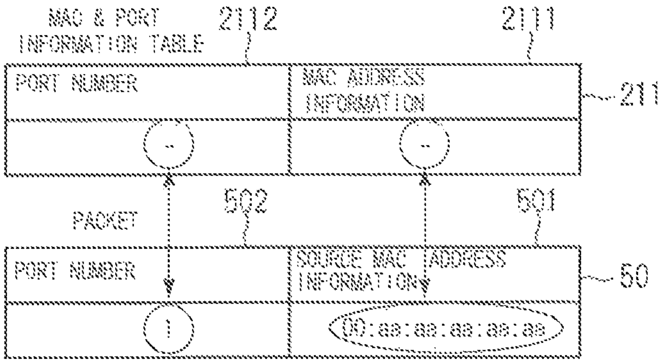
FIG. 3 is a diagram for explaining details of how terminal location information is compared in the first exemplary embodiment.

With reference to FIG. 3, a description is given of details of comparison contents of terminal location information.

The MAC & port information table 211, which is held by the terminal location information comparator 21, includes regions (or fields) storing MAC address information 2111 and the port numbers 2112.

The packet 50 has a region storing the source MAC address information 501 and the port number 502 in the header region.

When the packet comes in the node device 20-1, the node device 20-1 compares the contents of the MAC & port information table 211 with the contents of the packet 50.

In this operation, the node device 20-1 compares sets of the MAC address information 2111 stored in the MAC & port information table 211 and the port number 2112 associated with the MAC address information 2111, with the set of the source MAC address information 501 and the port number 502, which are held by the packet 50, with respect to the port and the MAC.

The node device 20-1 performs flow table comparison, when the contents of the MAC & port information table 211 matches the contents of the packet 50 as a result of the comparison.

When the contents of the MAC & port information table 211 does not match the contents of the packet 50 as a result of the comparison, the node device 20-1 starts an L2 learning function.

In other words, the MAC & port information table 211 is used as a table which holds a set (s) of the MAC address information of a terminal connected to the node device 20-1 and the port number of the port connected to the terminal, as terminal location information.

In this exemplary embodiment, the controller 30 can determine that the attribute of the port which receives the packet 50 is an outside port as well as an ingress port, in response to the reception of the inquiry information (packet-in) 51 generated upon a mismatch in this comparison.

Also, the controller 30 can manage the terminal location information on the basis of only two sorts of information: the source MAC address information 501 and the port number 502 of the packet 50.

[Terminal Location Information]

With reference to FIG. 4, a description is given of an example of the terminal location information management table 31 contained by the controller 30.

The terminal location information management table 31 has regions storing node device information 311, terminal MAC information 312 and port numbers 313.

The node device information 311 is a region into which identification information of node devices connected to terminals are written.

The terminal MAC information 312 is a region into which information of MAC addresses of the terminals (source MAC addresses) are written.

The port number 313 is a region into which the port numbers of the node devices connected to the terminals are written.

Presented here is one example in which the inquiry information (packet-in) 51, which is generated when a terminal location information comparison results in a mismatch, is managed by the controller 30.

The controller 30 receives the inquiry information (packet-in) 51 from the node device 20-1 and registers the information of the terminal into the terminal location information table 31 on the basis of the contents of the inquiry information (packet-in) 51.

In this operation, the controller 30 writes identification information of the node device connected to the terminal into the node device information 311 on the basis of the contents of the inquiry information (packet-in) 51, writes the source MAC address information of the terminal into the terminal MAC information 312, and writes the port number of the node device connected to the terminal into the port number 313.

[Configuration of System Using the Present Exemplary Embodiment]

Figure 5:
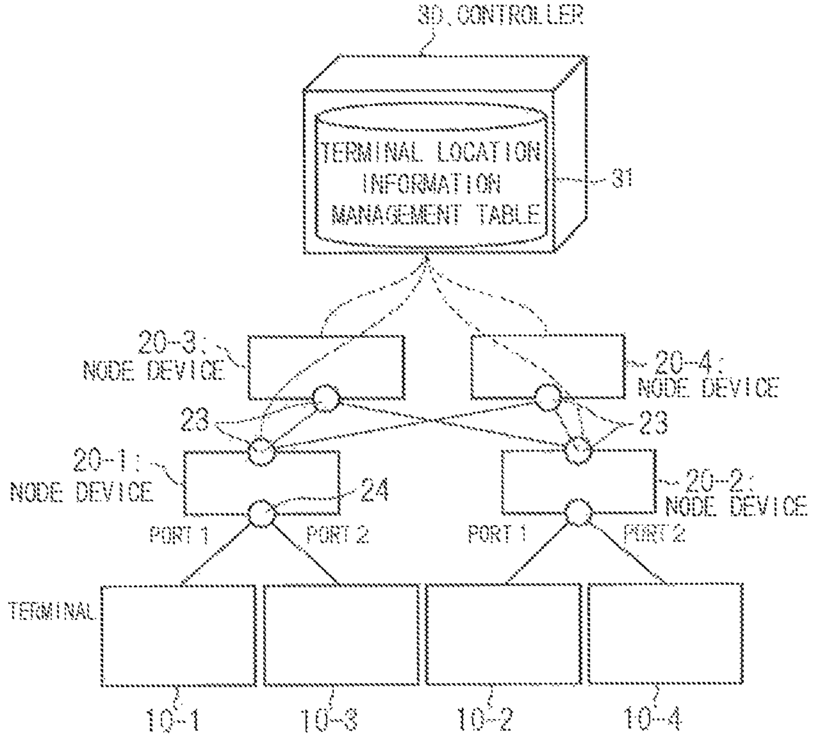
FIG. 5 is a diagram illustrating a configuration example of a system using the first exemplary embodiment.

With reference to FIG. 5, a description is given of a configuration example of a system using the present exemplary embodiment.

Let us assume that each node device 20 (20-j, where j=1 to m) has not transmitted any broadcast packets and nothing is written into the flow table 221.

This system includes terminals 10-1, 10-2, 10-3, 10-4, node devices 20-1, 20-2, 20-3, 20-4 and a controller 30.

It should be noted that the terminals 10-1, 10-2, 10-3 and 10-4 correspond to the terminals 10 (10-i, where i=1 to n) illustrated in FIG. 1.

It should be also noted that the node devices 20-1, 20-2, 20-3 and 20-4 correspond to the node devices 20 (20-j, where j=1 to m) illustrated in FIG. 1.

The controller 30 manages the node devices 20-1, 20-2, 20-3 and 20-4.

The controller 30 has a terminal location information management table 31.

The controller 30 defines a connection port by which node devices are connected as an inside port 23 and defines a connection port of a node device by which the node device and a terminal is connected as an outside port 24.

The node device 20-1 is connected to the terminal 10-1 on port 1 and to the terminal 10-3 on port 2.

The node device 20-2 is connected to the terminal 10-2 on port 1 and to the terminal 10-4 on port 2.

Ports 1 and 2 are both outside ports on the respective node devices 20-1 and 20-2.

In this example, the controller 30 determines the locations at which node devices are connected, defines the determined locations as inside ports 23, and manages the determined locations as management information.

On the basis of this management information, the controller 30 suppresses inquiry information (packet-in) generated when a terminal location information comparison performed on an inside port 23 results in a mismatch.

For example, the controller 30 may be configured to register a set of a port number of an inside port 23 and almighty MAC address information using a wild card or the like in the MAC & port information table 211 in the node device 20-1. In this case, the node device 20-1 is unconditionally switched to a process of the flow table comparator 22 for a packet received on the inside port 23, regardless of the source MAC address.

When the MAC & port information table 211 in the node device 20-1 is a sort of flow table, the controller 30 may register a flow entry with the lowest priority, the flow entry defining a set of a port number of an outside port 24 and almighty MAC address information using a wild card or the like as a rule and defining transfer of inquiry information to the controller 30 as an action. When the source MAC address information of a packet received on the outside port 24 is not registered, since this implies that only the above-described flow entry is registered, the node device 20-1 stores information of the present packet into inquiry information (packet-in) and transfers the inquiry information (packet-in) to the controller 30.

In this example, when a packet is transmitted from the terminal 10-1, which is connected to the node device 20-1, to the terminal 10-4, which is connected to the node device 20-2, the node device 20-1 performs terminal location information comparison for the packet, which comes from the terminal 10-1 via the outside port 24; when the terminal location information comparison results in a mismatch, the node device 20-1 stores information of the packet into inquiry information (packet-in) and transfers the inquiry information (packet-in) to the controller 30.

The controller 30 registers information of the terminal 10-1 into the terminal location information management table 31 on the basis of the information of the transferred inquiry information (packet-in), and registers a flow entry including the location of the terminal 10-1 (the set of the MAC address information and the port number) into the flow table 221 of the node device 20-1.

When another packet is transmitted from the terminal 10-1, the packet comes in the node device 20-1 via the outside port 24.

The terminal location information comparison results in a match, since the node device 20-1 already has the flow table registered with location information of the terminal 10-1. The node device 20-1 then searches the flow table 221, and if there is a matching flow entry, transfers the packet to the node device 20-2 in accordance with the action defined in the matching flow entry.

In this operation, terminal location information comparison is also performed for transfers among node devices; however, the controller 30 performs inside port management of each node device to suppress generation of inquiry information (packet-in). In other words, inquiry information (packet-in) is not generated in terminal location information comparison for transfers among node devices.

The node device 20-2 transfers the received packet to the terminal 10-4 as a result of the terminal location information comparison and flow table comparison.

[Connected Terminal Detection Process]

Figure 6:
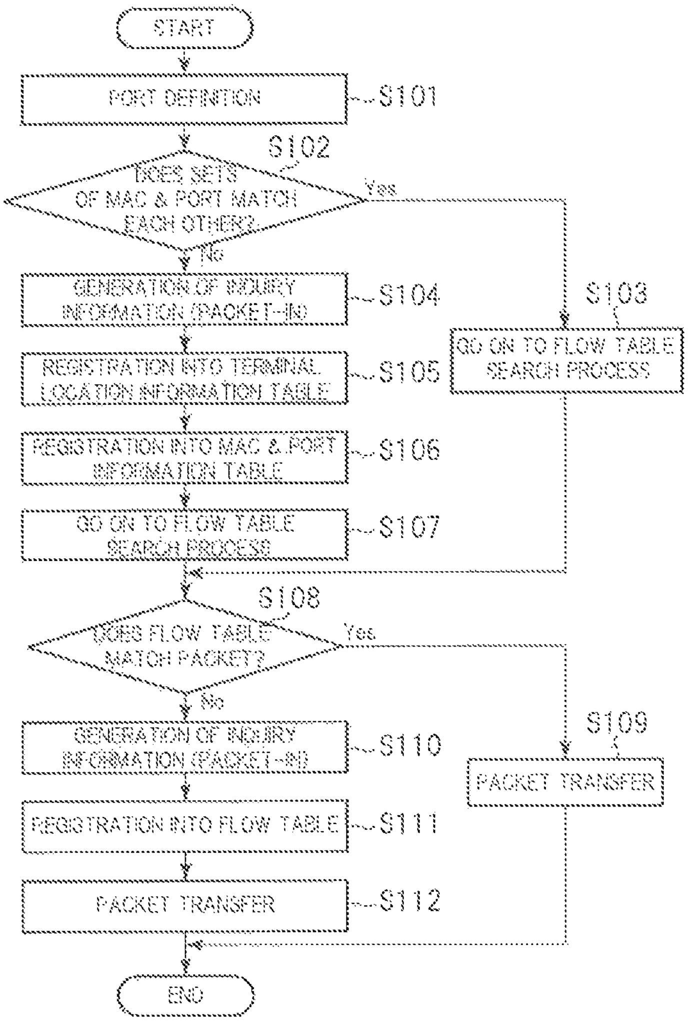
FIG. 6 is a flowchart for explaining a connected terminal detection process in the first exemplary embodiment.

With reference to FIG. 6, a description is given of the operation performed in a connected terminal detection process according to the present exemplary embodiment.

(1) Step S101

The controller 30 first calculates the connection ports of node devices on the basis of the previous route control, defines connection ports by which node devices are connected an inside ports 23, and defines the connection ports of node devices by which the node devices and terminals are connected as outside ports 24, allowing distinguishing the connection ports among node devices from the connection ports between node devices and terminals. Each node device 20 (20-j, where j=1 to m) then starts a normal operation.

(2) Step S102

When a packet 50 is transmitted from the terminal 10-1 to the terminal 10-2, the terminal location information comparator 21 of the node device 20-1 compares the MAC & port information table 211 in the terminal location information comparator 21 with the packet 50 by the comparison method illustrated in FIG. 3, to check whether the contents of the MAC & port information table 211 match the contents of the packet 50. Specifically, the terminal location information comparator 21 compares a set(s) of the MAC address information stored in the MAC & port information table 211 and the port number associated with this MAC address information with the source MAC address information and the port number of the packet received from the terminal 10-1, to check whether they match each other.

(3) Step S103

When the comparison results in a match, the terminal location information comparator 21 forwards the packet 50 to the flow table comparator 22.

(4) Step S104

When the comparison results in a mismatch, the terminal location information comparator 21 incorporates information of the packet 50 into inquiry information (packet-in) 51 and transmits the inquiry information (packet-in) 51 to the controller 30. In this operation, the terminal location information comparator 21 may temporarily stores the packet 50.

(5) Step S105

The controller 30 registers information indicative of which port of which node device the terminal 10-1 is connected to, into the terminal location information management table 31, on the basis of the information of the packet 50 incorporated in this inquiry information (packet-in) 51.

(6) Step S106

Also, the controller 30 registers a new set of MAC address information and a port number into the MAC & port information table 211 of the node device 20-1, on the basis of the terminal location information of the terminal location information management table 31. In this example, when the registration is completed, the controller 30 transmits the packet 50 to the node device 20-1 with the original header information on the basis of the information of the packet 50 incorporated in the inquiry information (packet-in) 51. If the registration is not done, the packet 50 may not be transmitted to the node device 20-1.

(7) Step S107

The terminal location information comparator 21 transfers the packet 50 in response to the above-described registration to the flow table comparator 22. In this example, the terminal location information comparator 21 transfers the packet 50 received from the controller 30 to the flow table comparator 22. It should be noted that, if the terminal location information comparator 21 temporarily stores the packet 50, the terminal location information comparator 21 may transfer the temporarily-stored packet 50 to the flow table comparator 22 in response to the registration from the controller 30. In this case, if the above-described registration is not performed, the terminal location information comparator 21 may discard the temporarily-stored packet 50 after a predetermined period expires.

(8) Step S108

When receiving the packet 50 from the terminal location information comparator 21, the flow table comparator 22 searches the flow table 221 contained therein to check whether any flow entry in the flow table 221 matches the packet 50. Specifically, the flow table comparator 22 compares the MAC address information stored in each flow entry of the flow table 221 with the destination MAC address information of the packet received from the terminal 10-1 to check whether the destination MAC address information of the received packet matches any flow entry of the flow table 221. It should be noted that, in an actual implementation, the flow table comparator 22 compares the "set of the MAC address information and port number" stored in each flow entry of the flow table 221 with the "set of the destination MAC address information and output port number" of the packet received from the terminal 10-1 to check whether the set of the destination MAC address information and the output port number of the received packet matches any flow entry of the flow table 221.

(9) Step S109

When the comparison results in a match with any flow entry of the flow table 221, the flow table comparator 22 outputs the packet 50 to an inside port 23 in accordance with the action of the matching flow entry, and transfers the packet 50 to the terminal 10-2.

(10) Step S110

When the comparison does not result in a match with any flow entries of the flow table 221, the flow table comparator 22 incorporates information of the packet 50 into inquiry information (packet-in) 52 and transmits the inquiry information (packet-in) 52 to the controller 30. In this operation, the flow table comparator 22 may temporarily store the packet 50.

(11) Step S111

The controller 30 calculates a transfer route on the basis of the information of the packet 50 incorporated in this inquiry information (packet-in) 52, and registers a flow entry which indicates the destination MAC address information of the packet 50 and orders to transfer the packet 50 to a predetermined inside port 23, into the flow table 221 of each of the node devices 20 (20-j, where j=1 to m) on the route. The controller 30 may transmit the packet 50 to the node device 20-1 on the basis of the information of the packet 50 incorporated in the inquiry information (packet-in) 52.

(12) Step S112

The flow table comparator 22 outputs the packet 50 to the inside port 23 in accordance with the action of the flow entry registered in the flow table 221 to transfer the packet 50 to the terminal 10-2. In this operation, the flow table comparator 22 may output the packet 50 received from the controller 30 or the packet 50 temporarily stored therein to the inside port 23 to transfer the packet 50 to the terminal 10-2. It should be noted that, if the flow entry registration is not performed, the flow table comparator 22 may discard the temporarily stored packet 50 after a predetermined period expires.

[Feature of the Present Exemplary Embodiment]

In the present exemplary embodiment, a node device compares MAC address information held therein and a port number associated therewith with the source MAC address information and port number of a packet, and when they do not match, transmits inquiry information (packet-in) to a controller.

The controller accumulates the location of a terminal from this inquiry information (packet-in) and registers a flow entry including the terminal location into a flow table of the node device.

Accordingly, the location of a terminal connected to a node device can be determined based only on the source MAC address information and port number of a packet.

This allows specifying the location of the terminal by the controller, even when the terminal moves.

Also, in the present exemplary embodiment, in which the terminal location can be specified, the controller can select the route on the basis of the terminal information, allowing flexible selection of the route.

Also, in the present exemplary embodiment, the controller can manage the terminal location information from information of inquiry information (packet-in) generated when terminal location information comparison results in a mismatch, and use the managed information as the basis of the route selection.

<Second Exemplary Embodiment>

In the following, a description is given of a second exemplary embodiment of the present invention. In the second exemplary embodiment of the present invention, an OpenFlow transfer process is performed as usual, independently of generation of inquiry information (packet-in), when terminal location information comparison results in a mismatch.

[System Configuration]

Figure 7:
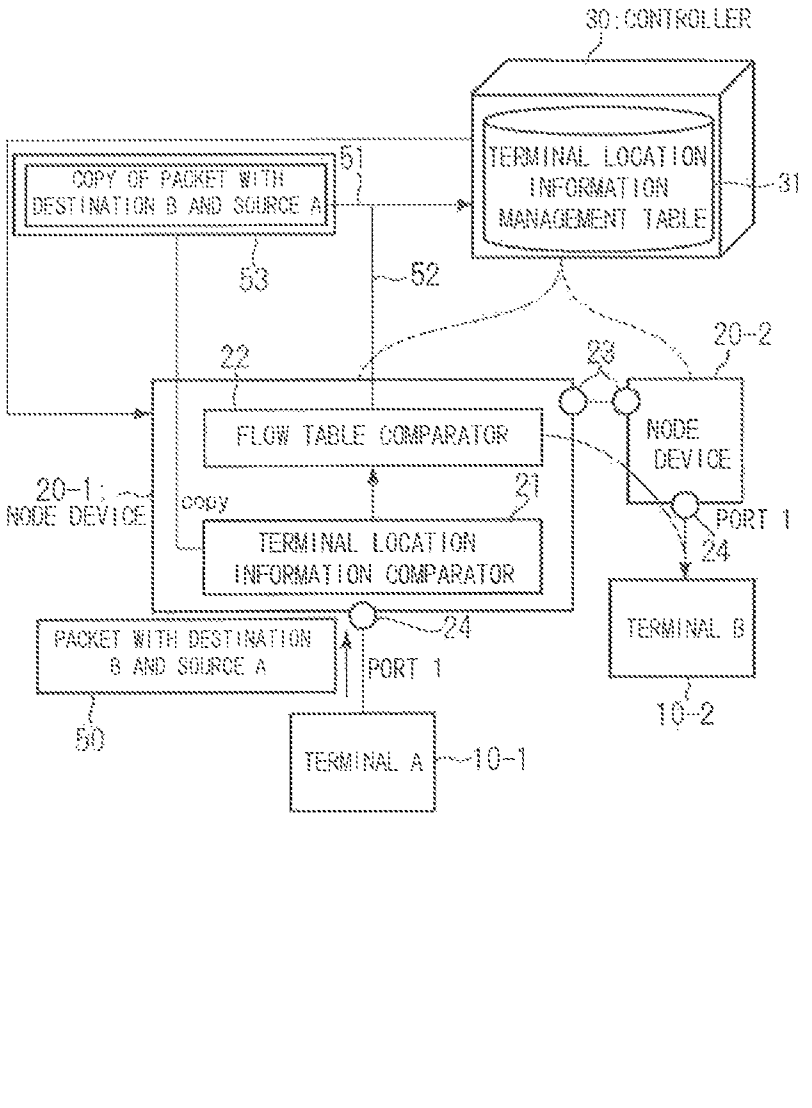
FIG. 7 is a diagram illustrating a configuration example of a network system according to a second embodiment of the present invention.

With reference to FIG. 7, a description is given of a configuration example of a network system according to the second exemplary embodiment of the present invention.

The network system according to the second exemplary embodiment of the present invention includes terminals 10 (10-i, where i=1 to n), node devices 20 (20-j, where j=1 to m) and a controller 30.

The terminals 10 (10-i, where i=1 to n), the node devices 20 (20-j, where j=1 to m) and the controller 30 are basically same as those illustrated in FIG. 1.

In the present exemplary embodiment, when comparison of terminal location information results in a mismatch, the terminal location information comparator 21 of the node device 20-1 copies a packet 50 (a packet of destination B and source A) and generates inquiry information (packet-in) 51 incorporating the copy packet 53.

The controller 30 first calculates the connection ports of node devices on the basis of the previous route control and defines the connection ports as inside ports 23. The controller 30 thereby suppresses generation of inquiry information (packet-in) 51, even when terminal location information comparison results in a mismatch on a connection port by which node devices are connected. Each node device 20 (20-j, where j=1 to m) then starts a normal operation.

When a packet 50 is transmitted from the terminal 10-1 to the terminal 10-2, the node device 20-1 performs terminal location information comparison for the packet received from the terminal 10-1; if the terminal location information comparison results in a mismatch, the node device 20-1 copies the packet 50 (the packet of destination B and source A) to be stored, and generates inquiry information (packet-in) 51 incorporating the copy packet.

The controller 30 registers information indicative of which port of which node device the terminal 10-1 is connected to, into the terminal location information management table 31, on the basis of the information of the packet 50 incorporated in this inquiry information (packet-in) 51.

The controller 30 rewrites the flow table 221 of the node device 20-1 for the received packet, on the basis of the terminal location information management table 31.

It should be noted that, in the present exemplary embodiment, the controller 30 updates the flow table 221; the controller 30 does not update the MAC & port information table 211 in response to the inquiry information (packet-in) 51. In other words, the controller 30 registers a flow entry including a set of the MAC address information and the port number into the flow table 221.

After the terminal location information comparison, the terminal location information comparator 21 of the node device 20-1 searches the flow table 221, and if any flow entry in the flow table 221 matches the contents of the packet 50, transfers the packet 50 to the terminal 10-2 in accordance with the transfer route of the controller 30.

The flow table comparator 22 of the node device 20-1 searches the flow table, and if it results in a mismatch with the flow table, generates inquiry information (packet-in) 52 which is transmitted to the controller 30.

As thus described, in the present exemplary embodiment, the node device 20-1 unconditionally searches the flow table 221 upon the reception of the packet 50, regardless of whether the terminal location information comparison results in a match or a mismatch, and performs a transfer process of the packet 50.

Specifically, when transmitting the inquiry information (packet-in) 51 to controller 30, the terminal location information comparator 21 of the node device 20-1 copies the packet 50 (the packet with destination B and source A) and transmits the inquiry information (packet-in) 51 incorporating the copy packet 53 to the controller 30. At the same time of or in parallel with this process, the node device 20-1 transfers the packet 50 to the flow table comparator 22.

[Internal Configuration of Node Devices]

Figure 8:
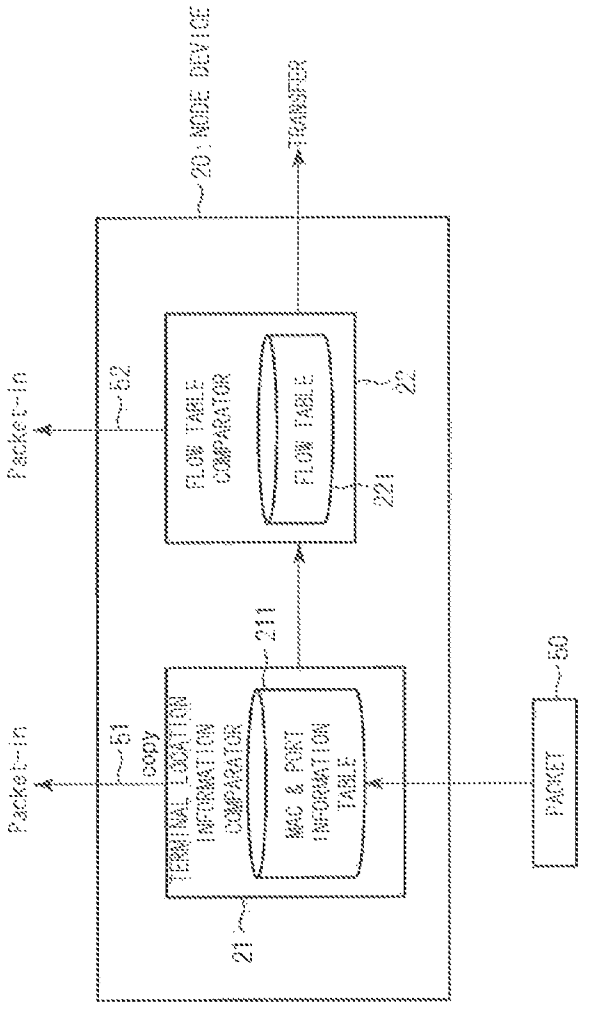
FIG. 8 is a diagram explaining the internal configuration of a node device according to the second exemplary embodiment.

With reference to FIG. 8, a description is given of the internal configuration of each node device 20 (20-j, where j=1 to m) in the present exemplary embodiment.

The internal configuration of each node device 20 (20-j, where j=1 to m) is basically same as that illustrated in FIG. 2.

In FIG. 8, the node device 20 (20-j, j=1 to m) performs an OpenFlow transfer process as usual when terminal location information comparison results in a mismatch, even if inquiry information (packet-in) 51 is generated.

The terminal location information comparator 21 compares the contents of the MAC & port information table 211 with the contents of the packet 50.

When the contents of the MAC & port information table 211 do not match the contents of the packet 50, the terminal location information comparator 21 copies the packet 50, generates inquiry information (packet-in) 51 incorporating the copy packet 53, and transmits the inquiry information (packet-in) 51 to the controller 30.

When the terminal location information comparator 21 completes the comparison of the contents of the MAC & port information table 211 with the contents of the packet 50, the procedure goes on to a process in the flow table comparator 22, regardless of the result of the comparison.

The flow table comparator 22 searches the flow table 221 and compares the contents of the flow table 221 with the contents of the packet 50.

When any flow entry in the flow table 221 matches the contents of the packet 50, the flow table comparator 22 transfers the packet 50 in accordance with the action of the matching flow entry.

When no flow entry in the flow table 221 matches the contents of the packet 50, the flow table comparator 22 transmits inquiry information (packet-in) 52 to the controller 30.

[Configuration of System Using the Present Exemplary] Embodiment

Figure 9:
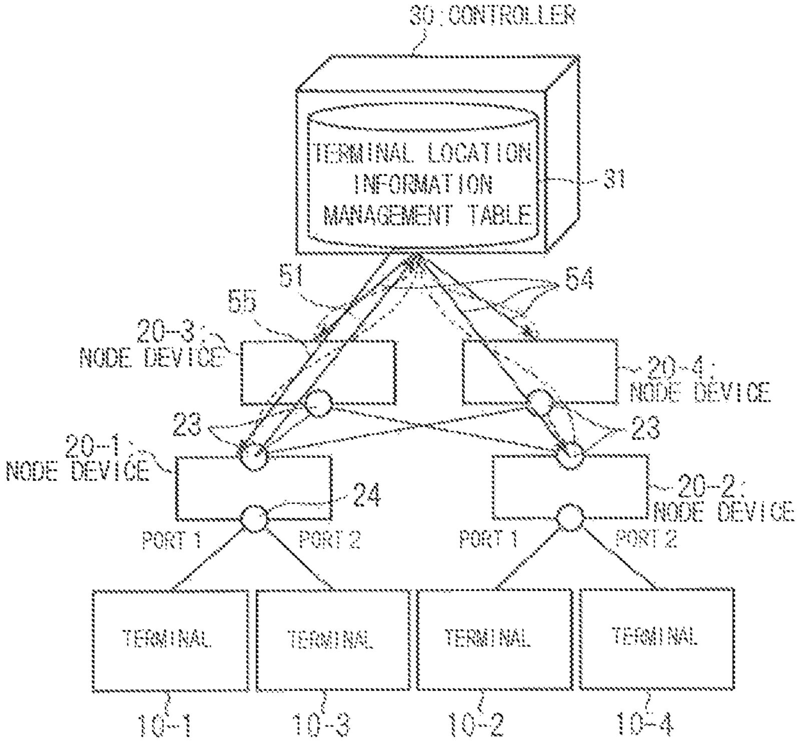
FIG. 9 is a diagram illustrating a configuration example of a system using the second exemplary embodiment.

With reference to FIG. 9, a description is given of a configuration example of a system using the present exemplary embodiment.

Let us assume that each node device 20 (20-j, where j=1 to m) has not transmitted any broadcast packets and nothing is written into the flow table 221.

This system includes terminals 10-1, 10-2, 10-3, 10-4, node devices 20-1, 20-2, 20-3, 20-4 and a controller 30.

It should be noted that the terminals 10-1, 10-2, 10-3 and 10-4 correspond to the terminals 10 (10-i, where i=1 to n) illustrated in FIG. 7.

It should be also noted that the node devices 20-1, 20-2, 20-3 and 20-4 correspond to the node devices 20 (20-j, where j=1 to m) illustrated in FIG. 7.

The controller 30 manages the node devices 20-1, 20-2, 20-3 and 20-4.

The controller 30 has a terminal location information management table 31.

The controller 30 defines a connection port by which node devices are connected as an inside port 23 and defines a connection port of a node device by which the node device and a terminal is connected as an outside port 24.

The node device 20-1 is connected to the terminal 10-1 on port 1 and to the terminal 10-3 on port 2.

The node device 20-2 is connected to the terminal 10-2 on port 1 and to the terminal 10-4 on port 2.

Ports 1 and 2 are both outside ports on each of the node devices 20-1 and 20-2.

In this example, the controller 30 determines the locations at which node devices are connected, and manages the determined locations, defining the determined locations as inside ports 23.

On the basis of this managed information, the controller 30 avoids registering the port number of the inside port 23 of the node device 20-1 into the MAC & port information table 211; the controller 30 suppresses generation of inquiry information (packet-in) by determining that a packet received on the inside port 23 is not subjected to terminal location information comparison.

In the following, a description is given of the case in which a packet is transmitted from the terminal 10-1, which is connected to the node device 20-1, to the terminal 10-4, which is connected to the node device 20-2.

When terminal location information comparison results in a mismatch for the packet 50 coming in from the terminal 10-1 via the outside port 24, the node device 20-1 incorporates the packet 50 into inquiry information (packet-in) 51 and transmits the inquiry information (packet-in) 51 to the controller 30.

When receiving the inquiry information (packet-in) 51 from the node device 20-1, the controller 30 registers information of the terminal 10-1 into the terminal location information management table 31 on the basis of the contents of the inquiry information (packet-in) 51.

The controller 30 also calculates a packet transfer route on the basis of the contents of the inquiry information (packet-in) 51, and registers a flow entry into the flow table 221 of each node device 20 (20-j, where j=1 to m) related to the route.

In this operation, the controller 30 transmits flow modification information (FlowMod-Add) to not only the flow table 221 of the node device 20-1 but also each of the plurality of node devices 20 (20-j, where j=1 to m) connected to the controller 30 and registers a flow entry based on the terminal location information into the flow table 221 of each node device 20. The flow modification information (FlowMod-Add) is a sort of OpenFlow messages.

Specifically, the controller 30 transmits flow modification information (FlowMod-Add) 54 to the plurality of node devices (node devices 20-2, 20-3 and 20-4) connected to the controller 30 and thereby registers (updates or reflects) a flow entry including the location (terminal location information) of the terminal 10-1, which is connected to the node device 20-1, into the flow table 221 of each node device 20. The flow modification information (FlowMod-Add) 54 is a control message for achieving flow entry registration into the flow table 221 for each of the node devices 20-2, 20-3 and 20-4.

After the completion of the above-described registration, the controller 30 transmits flow modification information (FlowMod-Add) 55 to the node device 20-1, and thereby registers a flow entry including the location (terminal location information) of the terminal 10-1 into the flow table 221 of the node device 20-1. The flow modification information (FlowMod-Add) 55 is a control message for achieving flow entry registration into the flow table 221 for the node device 20-1.

When the terminal 10-1 then transmits another packet 50, the packet 50 comes in the node device 20-1 via the outside port 24.

Since the flow entry having the location information of the terminal 10-1 has been already registered in the flow table 221 in the node device 20-1, when the terminal location information comparison results in that the packet 50 matches a flow entry, and the search of the flow table results in a match, the packet 50 is transferred to the node device 20-2 in accordance with the route control of the controller 30.

In this operation, a terminal location information comparison is performed for a transfer between node devices; however, the controller 30 suppresses generation of inquiry information (packet-in) by performing inside port management of each node device. In other words, the controller 30 avoids generation of inquiry information (packet-in) in the terminal location information comparison for a transfer between node devices.

The node device 20-2 transfers the transferred packet to the terminal 10-4 as a result of flow table comparison.

<Third Exemplary Embodiment>

In the following, a description is given of a third exemplary embodiment of the present invention. In the third exemplary embodiment of the present invention, the OpenFlow transfer is achieved by only the terminal location information comparison, without performing the flow table comparison. Specifically, a terminal location information comparison is performed by using the MAC & port information table and then destination comparison is performed by using the MAC & port information table again to achieve OpenFlow transfer.

[Internal Configuration of Node Devices]

Figure 10:
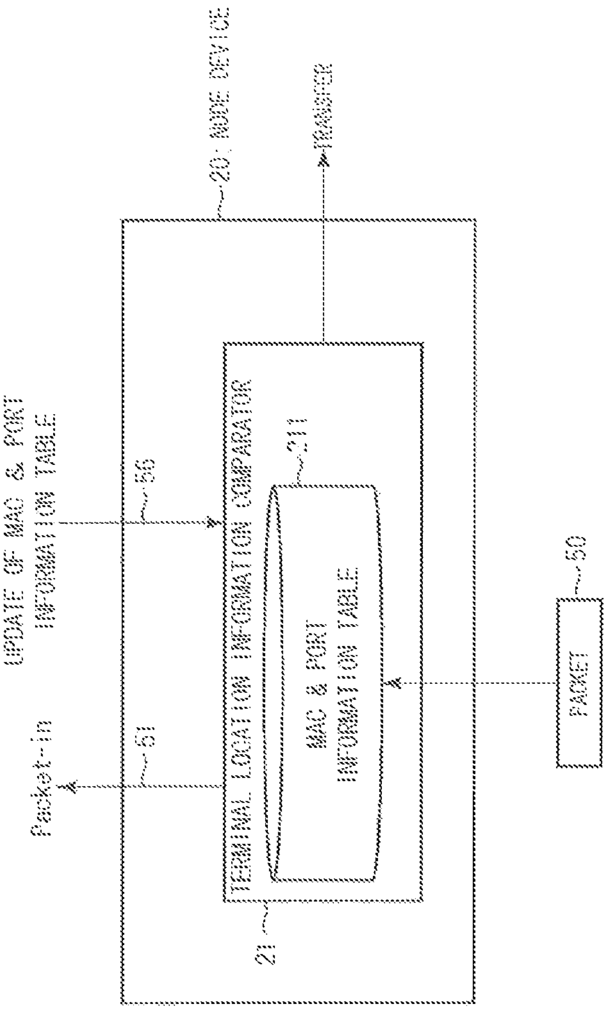
FIG. 10 is a diagram for explaining the internal configuration of a node device according to the third exemplary embodiment.

With reference to FIG. 10, a description is given of the internal configuration of the node devices 20 (20-i, where i=1 to n) in the present exemplary embodiment.

When receiving a packet 50, a node device 20 (20-i, where i=1 to n) performs terminal location information comparison, and if the terminal location information comparison results in a match, achieves packet transfer by using again the MAC & port information table 211, which is already used for the comparison.

For example, when the terminal location information comparison results in a match, the node device 20 (20-i, where i=1 to n) compares again the MAC address information of the MAC & port information table 211, which has been used for the comparison, with the destination MAC address of the packet; if a match occurs, the node device 20 performs packet transfer.

Also, if a match does not occur, the node device 20 (20-i, where i=1 to n) generates inquiry information (packet-in) 51.

When the terminal location information comparison results in a mismatch, for example, the node device 20 (20-i, where i=1 to n) generates the inquiry information (packet-in) 51, and transmits the inquiry information (packet-in) 51 to the controller 30.

On the basis of the contents of the inquiry information (packet-in) 51, the controller 30 updates the MAC & port information table 211 of each node device 20 by transmitting flow modification information (FlowMod-Add) 56 to each of the plurality of node devices (20-j, where j=1 to m) connected to the controller 30. The flow modification information (FlowMod-Add) 56 is a control message used for update of the MAC & port information table 211 for each node device 20.

[Comparison Contents of Terminal Location Information]

Figure 11:
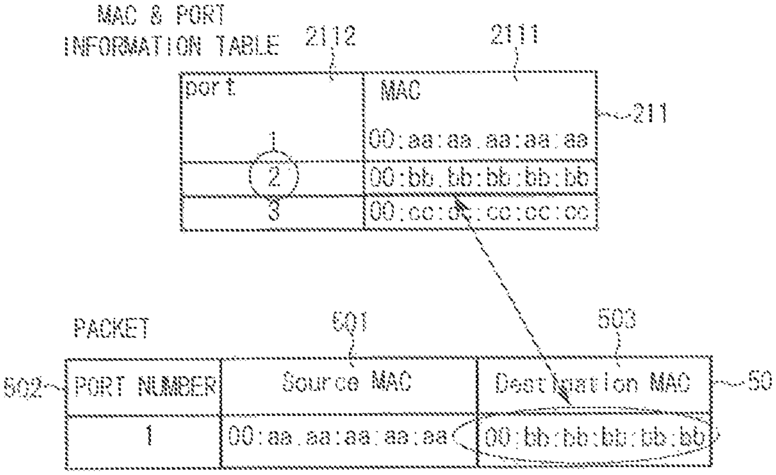
FIG. 11 is a diagram for explaining details of how terminal location information is compared in the third exemplary embodiment.

With reference to FIG. 11, a description is given of details of contents of comparison of MAC & port information table with the destination MAC address of a packet.

After performing the terminal location information comparison, the terminal location information comparator 21 compares the MAC & port information table 211 with the packet 50 again.

Specifically, the terminal location information comparator 21 compares the set(s) of the MAC address information 2111 stored in the MAC & port information table 211 and the port number 2112 associated with the MAC address information 2111 with the source MAC address information 501 and the port number 502 which are held by the packet 50, with respect to the port and the MAC.

When the comparison results in that the set(s) of the MAC address information 2111 and the port number 2112 matches the set of the source MAC address information 501 and the port number 502, the terminal location information comparator 21 compares the MAC address information 2111 of the MAC & port information table 211 with the destination MAC address information 503 of the packet 50, without using the source MAC address information 501 and the port number 502, which are used in the terminal location information comparison.

When this comparison results in a match, the terminal location information comparator 21 transfers the packet 50, using the port number 2112 associated with the MAC address information 2111 in the MAC & port information table 211 as the output port.

<Relation among Respective Exemplary Embodiments>

It should be noted that the above-described respective embodiments may be combined in implementation.

<Examples of Hardware>

In the following, a description is given of specific hardware used for realizing the network system according to the present invention.

Assumed examples of the terminals and the controller may include computers, such as PCs (personal computers), appliances, thin client servers, work stations, main frames, and super computers. Other examples of the terminals may include IP telephones, cellular phones, smart phones, smart books, car navigation systems, portable game consoles, consumer game machines, portable music players, handy terminals, gadgets (electrical equipment), interactive televisions, digital tuners, digital recorders, information home appliances, office automation equipment, shop terminals, high-end copy machines, and digital signage. It should be noted that the terminals and the controller may be transponders or peripheral device Possible examples of the node devices may include network switches, routers, proxies, gateways, firewalls, load balancers, packet shapers, security monitor and controllers (SCADAs: supervisory control and data acquisition), gatekeepers, base stations, access points (APs), communication satellites (CSs) and computers having multiple communication ports.

The terminals, the node devices and the controller may be an extension bard or a virtual machine (VM) built on a physical machine. The terminals, node devices and controller may be mounted on a moving body, such as a vehicle, a ship and an aircraft.

Although not shown, each of the terminals, the node devices and the controller are realized by a processor which operates based on programs to perform predetermined processes, a memory storing the programs and various data and a communication interface used for communications with a network.

Possible examples of the above-mentioned processor may include CPUs (central processing unit), microprocessors, microcontrollers and dedicated semiconductor integrated circuits (ICs).

Possible examples of the above-described memory may include: semiconductor memory devices such as RAMs (random access memories), ROMs (read only memories), EEPROMs (electrically erasable and programmable read only memories) and flash memories, auxiliary memory devices such as HDDs (hard disk drives) and SSDs (solid state drives), removable disks such as DVDs (digital versatile disks), and recording media such as SD (secure digital) memory cards. The above-described memory may be a buffer or a register. Instead, the memory may be a storage device which uses a DAS (direct attached storage), an FC-SAN (fiber channel-storage area network), an NAS (network attached storage), an IP-SAN (IP-storage area network) or the like.

The above-described processor and memory may be monolithically integrated. For example, recently, one-chip integration of microcomputers and the like has become popular. Accordingly, in one possible implementation, a one-chip microcomputer mounted on an electronic device or the like may be provided with the above-described processor and memory.

Possible examples of the above-described interface may include boards adapted to network communications (mother boards and I/O boards), semiconductor integrated circuits such as chips, network adaptors such as NICs (network interface cards), similar extension cards, communication apparatus such as antennas, and communication ports of connectors and the like.

Possible examples of the network may include the Internet, LANs (local area networks), wireless LANs, WANs (wide area networks), backbones, cable television (CATV) lines, fixed-line telephone networks, cellular phone networks, WiMAX (IEEE 802.16a), 3G (third generation), lease lines, IrDA (infrared data association), Bluetooth (registered trademark), serial communication lines and data buses.

It should be noted that internal components of each of the terminals, the node devices, and the controller may be each a module, a component, a dedicated device or a start (call) program.

It should be also noted that actual implementations are not limited to these examples.

<Summary>

As described above, the present invention relates to a network system which detects a terminal connected to a switch by using the OpenFlow function.

In the present invention, a node device compares a set of the source MAC address and port number of a packet transmitted from a terminal to the node device with a set (s) of MAC address information and a port number which are held in a preliminary search table (MAC & port information table) to check whether they match each other.

When this comparison does not result in a match, the node device notifies a controller of the set of the source MAC address information and port number held by the packet by using the inquiry information (packet-in) function of OpenFlow. The node device updates the preliminary search table if necessary.

If the load imposed on the controller is not cared, the node device may unconditionally notify the controller of the set of the source MAC address information and port number held by every packet.

Furthermore, the node device compares the destination MAC address information of the packet with a set (s) of the MAC address information held by a final search table (flow table) to check whether they match each other. It should be noted that, in an actual implementation, the node device may compares the set of the destination MAC address and port number of the packet with the set(s) of the MAC address information held by a final search table to check whether they match each other.

When this comparison does not result in a match, the node device makes an inquiry about the action to be performed on the packet by using the inquiry information (packet-in) function of OpenFlow. The node device also updates the final search table if necessary.

It should be noted that a common table is used as the preliminary search table and the final search table.

This allows determining which port of which node device a terminal connected to a group of node devices is connected to, on the basis of only the source MAC address and port number of a packet transmitted from the terminal.

Also, by managing this terminal connection information by the controller, a route control taking account of the terminal location can be achieved.

Also, data contents of the final search table (flow table) can be degenerated.

In the present invention, terminal location information comparison is performed for terminal movement detection, and when the terminal location information comparison results in a mismatch, this triggers generation of inquiry information (packet-in) incorporating the packet; the inquiry information (packet-in) is transmitted to a controller.

Also, when the terminal location information comparison results in a mismatch, the transmitted packet is copied and the copy packet is incorporated in inquiry information (packet-in); the inquiry information (packet-in) is transmitted to the controller.

Also, the inquiry information (packet-in) generated in response to an event in which the terminal location information comparison results in a mismatch is distinguished from inquiry information (packet-in) generated in response to a failure of a flow table search.

Furthermore, in the present invention, the node device notifies the controller of the location of the terminal connected to the node device by generating inquiry information (packet-in). This allows the controller to obtain the location information of the terminal connected to the node device on the basis of the inquiry information (packet-in) of the node device.

Also, the notification of terminal location information depends on attributes of ports. For example, a connection port by which node devices are connected is given an attribute of inside port, and a connection port of a node device by which the node device and a terminal are connected is given an attribute of outside port; this suppresses generation of inquiry information (packet-in) generated when terminal location information comparison results in a mismatch.

Also, terminal location information comparison is performed in the present invention. For example, a set(s) of MAC address information and a port number which are held by a node device is compared with a set of the source MAC address information and port number of a packet, respectively.

Also, MAC & port information table transfer is performed. For example, the MAC & port information table is compared with the destination MAC address of a packet and if the MAC & port information table matches the destination MAC address of the packet, the packet is transferred to the port associated with the MAC address information in the MAC & port information table.

Essentially, the present invention determines for a incoming flow whether packets are to be received from the source terminal by terminal location information comparison (comparison using the set(s) of the source MAC address and the port number), and determines whether packets are to be transferred to the destination terminal by flow table search (comparison using the destination MAC address).

<Note>

Although exemplary embodiments of the present invention are described in detail in the above, the present invention shall not be interpreted as being limited to the above-described exemplary embodiments; the present invention encompasses modifications which do not depart from the substance of the present invention.

The present application claims priority based on Japanese Patent Application No. 2011-082765 and the disclosure in Japanese Patent Application No. 2011-082765 is incorporated herein by reference.

The invention claimed is:

1. A network system, comprising:

a node device containing a MAC and port information table describing sets of a MAC address and port number, and a flow table including flow entries each defining a rule and action for collectively controlling packets as a flow, and configured to handle received packets in accordance with the flow entries; and a controller setting the flow entries to the node device, wherein, the node device is configured to:

compare, when receiving a packet from a terminal, a set of a source MAC address and port number described in the packet with the sets of the MAC address and port number described in the MAC and port information table, compare, based on a determination that the set of the source MAC address information and port number of the packet matches any of the sets of the MAC address information and port number described in the MAC and port information table, a destination MAC address described in the packet with the MAC addresses described in the flow entries of the flow table, transfer, based on a determination that the destination MAC address described in the packet matches one of the MAC addresses described in the flow entries of the flow table, the packet in accordance with an action described in one of the flow entries that is associated with the MAC address which matches the destination MAC address described in the packet, and wherein the controller is configured to:

suppress the generation of an Open Flow inquiry packet when a terminal location information comparison performed on an inside port does not result in a match, wherein the inside port includes a port connecting the node device to another node device; and allow the generation of the Open Flow inquiry packet when a terminal location information comparison performed on an outside port does not result in a match, wherein the outside port includes a port connecting the node device to a terminal.

2. The network system according to claim 1, wherein the node device is further configured to:

generate, based on a determination that the set of the source MAC address information and port number described in the packet does not match any of the sets of the MAC address information and port number described in the MAC and port information table, a first inquiry packet based on the packet to transmit the first inquiry packet to the controller, and generate, based on a determination that the destination MAC address described in the packet does not match any of the MAC addresses described in the flow entries of the flow table, a second inquiry packet based on the packet to transmit the second inquiry packet to the controller;

wherein the controller is configured to:

recognize a current location of the terminal on a network from the first inquiry packet received from the node device and to manage the MAC and port information table based on contents of the first inquiry packet, and update the flow table based on contents of the second inquiry packet.

3. The network system according to claim 2, wherein the first inquiry packet describes a MAC address of the terminal and a port number of a port of the node device to which the terminal is connected.

4. The network system according to claim 2, wherein the first and second inquiry packets include different identification information.

5. The network system according to claim 1, wherein the MAC and port information table ~s separate from the flow table in the node device.

6. A method of operating a node device containing a MAC and port information table describing sets of a MAC address and port number, and a flow table including flow entries each defining a rule and action for collectively controlling packets as a flow, the method comprising:

comparing, when receiving a packet from a terminal, a set of a source MAC address and port number described in the packet with the sets of the MAC address and port number described in the MAC and port information table;

comparing, based on a determination that the set of the source MAC address information and port number of the packet matches any of the sets of the MAC address information and port number described in the MAC and port information table, a destination MAC address described in the packet with the MAC addresses described in the flow entries of the flow table, transferring, based on a determination that the destination MAC address described in the packet matches one of the MAC addresses described in the flow entries of the flow table, the packet in accordance with an action described in one of the flow entries that is associated with the MAC address which matches the destination MAC address described in the packet;

suppressing the generation of an OpenFlow inquiry packet when a terminal location information comparison performed on an inside port does not result in a match, wherein the inside port includes a port connecting the node device to another node device; and allowing the generation of the OpenFlow inquiry packet when a terminal location information comparison performed on an outside port does not result in a match, wherein the outside port includes a port connecting the node device to the terminal.

7. The method according to claim 6, further comprising:

generating, based on a determination that the set of the source MAC address information and port number described in the packet does not match any of the sets of the MAC address information and port number described in the MAC and port information table, a first inquiry packet based on the packet to transmit the first inquiry packet to a controller;

generating, based on a determination that the destination MAC address described in the packet does not match any of the MAC addresses described in the flow entries of the flow table, a second inquiry packet based on the packet to transmit the second inquiry packet to the controller;

recognizing, a current location of the terminal on a network from the first inquiry packet received from the node device and to manage the MAC and port information table based on contents of the first inquiry packet; and updating, the flow table based on contents of the second inquiry packet.

8. The method according to claim 7, wherein the first inquiry packet describes a MAC address of the terminal and a port number of a port of the node device to which the terminal is connected.

9. The method according to claim 7, wherein the first and second inquiry packets include different identification information.

10. A connected terminal detection method operating a controller and a node device, comprising:

setting flow entries defining a rule and action for collectively controlling packets as a flow to a node device;

comparing, when the node device receives a packet from a terminal, a set of a source MAC address and port number described in the packet with the sets of the MAC address and port number described in a MAC and port information table contained in the node device;

comparing, based on a determination that the set of the source MAC address information and port number of the packet matches any of the sets of the MAC address information and port number described in the MAC and port information table, a destination MAC address described in the packet with the MAC addresses described in the flow entries of the flow table, transferring, based on a determination that the destination MAC address described in the packet matches one of the MAC addresses described in the flow entries of the flow table, the packet in accordance with an action described in one of the flow entries that is associated with the MAC address which matches the destination MAC address described in the packet;

suppressing the generation of an Open Flow inquiry packet when a terminal location information comparison performed on an inside port does not result in a match, wherein the inside port includes a port connecting the node device to another node device; and allowing the generation of the OpenFlow inquiry packet when a terminal location information comparison performed on an outside port does not result in a match, wherein the outside port includes a port connecting the node device to the terminal.

11. The connected terminal detection method according to claim 10, further comprising:

generating, based on a determination that the set of the source MAC address information and port number described in the packet does not match any of the sets of the MAC address information and port number described in the MAC and port information table, a first inquiry packet based on the packet to transmit the first inquiry packet to the controller;

generating, based on a determination that the destination MAC address described in the packet does not match any of the MAC addresses described in the flow entries of the flow table, a second inquiry packet based on the packet to transmit the second inquiry packet to the controller;

recognizing, a current location of the terminal on a network from the first inquiry packet received from the node device and to manage the MAC and port information table based on contents of the first inquiry packet; and updating, the flow table based on contents of the second inquiry packet.

12. The connected terminal detection method according to claim 11, wherein the first inquiry packet describes a MAC address of the terminal and a port number of a port of the node device to which the terminal is connected.

13. The connected terminal detection method according to claim 11, wherein the first and second inquiry packets include different identification information.

14. A non-transitory recording medium storing a program which, when executed, causes a node device containing a MAC and port information table describing sets of a MAC address and port number and a flow table including flow entries each defining a rule and action for collectively controlling packets as a flow to perform a method comprising:

comparing, when receiving a packet from a terminal, a set of a source MAC address and port number described in the packet with the sets of the MAC address and port number described in the MAC and port information table;

comparing, based on a determination that the set of the source MAC address information and port number of the packet matches any of the sets of the MAC address information and port number described in the MAC and port information table, a destination MAC address described in the packet with the MAC addresses described in the flow entries of the flow table, transferring, based on a determination that the destination MAC address described in the packet matches one of the MAC addresses described in the flow entries of the flow table, the packet in accordance with an action described in one of the flow entries that is associated with the MAC address which matches the destination MAC address described in the packet;

suppressing the generation of an Open Flow inquiry packet when a terminal location information comparison performed on an inside port does not result in a match, wherein the inside port includes a port connecting the node device to another node device; and allowing the generation of the OpenFlow inquiry packet when a terminal location information comparison performed on an outside port does not result in a match, wherein the outside port includes a port connecting the node device to the terminal.

15. The non-transitory recording medium according to claim 14, wherein the method further comprising:

generating, based on a determination that the set of the source MAC address information and port number described in the packet does not match any of the sets of the MAC address information and port number described in the MAC and port information table, a first inquiry packet based on the packet to transmit the first inquiry packet to a controller;

generating, based on a determination that the destination MAC address described in the packet does not match any of the MAC addresses described in the flow entries of the flow table, a second inquiry packet based on the packet to transmit the second inquiry packet to the controller;

recognizing a current location of the terminal on a network from the first inquiry packet received from the node device and to manage the MAC and port information table based on contents of the first inquiry packet; and updating the flow table based on contents of the second inquiry packet.

16. The non-transitory recording medium according to claim 15, wherein the first inquiry packet describes a MAC address of the terminal and a port number of the port of the node device to which the terminal is connected.

17. The non-transitory recording medium according to claim 15, wherein the first and second inquiry packets include different identification information.

* * * * *